(12) United States Patent
Marinus et al.

(10) Patent No.: US 6,198,232 B1
(45) Date of Patent: Mar. 6, 2001

(54) DISCHARGE LAMP CIRCUIT WITH DUAL IGNITION COILS

(75) Inventors: Antonius A. M. Marinus; Ludovicus F. J. Oostvogels; Etienne N. K. P. M. Eberson, all of Eindhoven; Arjan J. Van Den Berg, Nijmegen, all of (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/425,659

(22) Filed: Oct. 22, 1999

(30) Foreign Application Priority Data

Oct. 22, 1998 (EP) .................................................. 98203563

(51) Int. Cl.⁷ .................................................. H05B 37/00
(52) U.S. Cl. ..................... 315/290; 315/240; 315/209 R; 315/307; 315/DIG. 5
(58) Field of Search ............................... 315/209 R, 210, 315/209 CD, 237, 240, 241 R, 307, 308, 291, DIG. 5, 56–62, 71–74; 323/282, 224, 290, 351

(56) References Cited

U.S. PATENT DOCUMENTS

| | | | |
|---|---|---|---|
| 3,857,060 | * 12/1974 | Chermin | 315/99 |
| 5,581,161 | 12/1996 | Gong | 315/307 |
| 5,994,846 | * 11/1999 | Blankers | 315/209 R |
| 6,011,361 | * 1/2000 | Blankers | 315/307 |

OTHER PUBLICATIONS

U.S. application No. 9/400,760, filed: Sep. 21, 1999.

* cited by examiner

*Primary Examiner*—Haissa Philogene
(74) *Attorney, Agent, or Firm*—Bernard Franzblau

(57) ABSTRACT

A ballast circuit for a compact fluorescent lamp includes a down-converter for operating the lamp with a DC current during stationary operation. The ballast circuit is equipped with an additional inductor. The choke of the down-converter and the additional inductor jointly ignite the lamp. During stationary operation, the additional inductor conveys no current.

20 Claims, 2 Drawing Sheets

DISCHARGE LAMP CIRCUIT WITH DUAL IGNITION COILS

BACKGROUND OF THE INVENTION

This invention relates to a circuit arrangement for igniting and supplying a lamp with a DC current, comprising input terminals for connection to terminals of a power supply source supplying a DC voltage, a DC-DC converter coupled to the input terminals and provided with a first inductive element, a first unidirectional element, a first switching element, a control circuit coupled to a control electrode of the first switching element for rendering the first switching element conducting and non-conducting at a frequency f, output terminals for connecting the lamp, and a first circuit which connects the output terminals during operation and comprises a second switching element and means for rendering the second switching element conducting and non-conducting.

The invention also relates to a compact lamp.

A circuit arrangement as described in the opening paragraph is known from U.S. Pat. No. 5,581,161. In the known circuit arrangement, the DC-DC converter is constituted by a down-converter. The second switching element is conducting immediately after the known circuit arrangement is put into operation. The control circuit renders the first switching element conducting and non-conducting at a frequency f. During operation of the known circuit arrangement, both a first and a second lamp electrode form a part of the first circuit. The first inductive element and the first circuit convey current during a first time interval, so that the electrodes of the lamp connected to the circuit arrangement are preheated. At the end of the first time interval, the second switching element is rendered non-conducting, so that the first circuit no longer conveys current. The first inductive element subsequently generates an ignition voltage. After ignition of the lamp and during stationary operation, the second switching element remains non-conducting and the control circuit renders the first switching element high-frequency conducting and non-conducting, and a lamp connected to the circuit arrangement is fed with a DC current supplied by the down-converter. Since the down-converter consists of only a small number of components, the known circuit arrangement can be manufactured relatively easily and thus also at low cost. A drawback of the known circuit arrangement is, however, that the first inductive element must be dimensioned in such a way that the lamp ignites reliably and rapidly. Since the first inductive element also conveys current during stationary operation of the lamp, the power losses occurring in the first inductive element during stationary operation should be relatively low. For these reasons, the first inductive element is often relatively large in practice and is expensive. Moreover, the ignition process-dictated dimensioning of the first inductive element is often not optimal for stationary lamp operation.

SUMMARY OF THE INVENTION

It is an object of the invention to provide a relatively simple and, hence, low-cost circuit arrangement for igniting and supplying a lamp with a DC current, with which the lamp can be ignited in an efficient and reliable manner.

According to the invention, a circuit arrangement as described in the opening paragraph is therefore characterized in that the first circuit comprises a series arrangement of the second switching element, a second inductive element and a second unidirectional element, and the series arrangement of the second inductive element and the second unidirectional element is shunted by a second circuit comprising a third unidirectional element.

During the period when the second switching element is conducting, both the first and the second inductive element convey current. For this reason, the quantity of energy which is available for generating an ignition voltage across the lamp when the second switching element becomes non-conducting is equal to the sum of the energy in the first inductive element and the energy in the second inductive element. However, during stationary operation of the circuit arrangement, only the first inductive element conveys a current. For this reason, it is possible to choose the first inductive element optimally for stationary operation and independently of the energy required for ignition to be (relatively) small. The first and the second inductive element may be alternatively chosen to be such that the control circuit renders the first switching element conducting and non-conducting in the same way and at the same frequency f during the different phases of the lamp operation before and after ignition of the first switching element, so that the control circuit may be implemented in a relatively simple way. Moreover, only the first inductive element is to comply with the requirement that power losses occurring in this inductive element should be relatively small. The second inductive element may be dimensioned in such a way that a reliable ignition behavior is realized. Since the second inductive element conveys a current for a relatively short time only before ignition of the lamp, considerably less stringent requirements may be imposed with respect to the power losses occurring in the second inductive element than is the case for the first inductive element. A circuit arrangement according to the invention may thus be considerably cheaper at a given total inductance of both the first and the second inductive element.

Satisfactory results have been obtained with embodiments of a circuit arrangement according to the invention, in which the DC-DC converter comprises a down-converter.

The unidirectional element may be realized in a relatively simple and, hence, low-cost manner if the unidirectional element comprises a diode.

It is possible to implement the second switching element as a semiconductor switching element and to realize the means for rendering this semiconductor switching element consecutively conducting and non-conducting with the aid of a second control circuit which is coupled to a control electrode of the semiconductor switching element. However, if the second switching element is implemented as a glow discharge starter, a separate control circuit is not necessary for realizing the consecutive conductance and non-conductance of the second switching element. The circuit arrangement thus comprises a relatively small number of components and can therefore be manufactured in a relatively simple way and at low cost.

The amplitude of the ignition voltage is dependent on the instantaneous amplitude of the current in the inductive elements when the second switching element becomes non-conducting. In practice, the DC-DC converter is often operated in the discontinuous mode so as to limit switching losses. This means that the current through the first inductive element and the second inductive element in each period associated with the frequency f becomes substantially equal to zero during a given time interval and before the lamp is ignited. By rendering the first switching element conducting while the current in the first and the second inductive element is substantially zero, a considerable power dissipation in the unidirectional element is prevented so that the circuit arrangement has a relatively high efficiency. However, if the second switching element becomes non-conducting when the current in the inductive elements is substantially zero or has a relatively low instantaneous amplitude, the energy present in the inductive elements is insufficient to generate an ignition voltage with a sufficiently high amplitude. This problem could be solved by implementing the means for rendering the second switching element conducting and non-conducting in such a way that these means render the second switching element non-conducting when the instantaneous amplitude of the current in the inductive elements has a relatively high value. Such an implementation of the means for rendering the second switching element conducting and non-conducting would, however, render the circuit arrangement relatively complicated and expensive. It has been found to be advantageous to provide the control circuit with a circuit section I for decreasing the frequency f after ignition of the lamp. By choosing the frequency f before ignition of the lamp to be relatively high, it is achieved that the DC-DC converter is operated in the continuous mode during this phase of the lamp operation and the current in the inductive elements is constituted by the sum of a DC component with a relatively high amplitude and an AC component with a relatively low amplitude. At such a shape of the current in the inductive element, the instantaneous value of the amplitude of this current is high enough at any instant to generate an ignition pulse with a sufficiently high amplitude for igniting the lamp if the second switching element becomes non-conducting at that instant. The value of the amplitude of the current can be increased by rendering the first switching element conducting prior to ignition of the lamp at a relatively high duty cycle and in each period associated with the frequency f. After ignition of the lamp, this duty cycle may be reduced by means incorporated in the control circuit. Duty cycle control is known, for example, see U.S. Pat. No. 4,952,849 by Fellows et al (e.g. col. 12, lines 23–30). This U.S. patent is hereby incorporated by reference into this patent application. The relatively high value of the frequency f also ensures that, if breakdown of the plasma of the lamp occurs during the period when the first switching element is non-conducting, this first switching element is rendered conducting again for only a relatively short time interval after the occurrence of the breakdown so that the lamp can convey a current while the charge carriers formed by the breakdown are still present in the plasma. Consequently, a satisfactory take-over of the lamp is realized. After ignition of the lamp, the circuit section I decreases the frequency f. The frequency f after ignition of the lamp may be chosen to be such that the DC-DC converter is operated in the discontinuous mode so that the switching losses during stationary supply of the lamp are limited to a considerable extent. Since the time interval between the instant when the circuit arrangement is put into operation and the ignition of the lamp is often relatively short in practice, the switching losses occurring in the DC-DC converter during operation in the continuous mode do not give rise to relatively high temperatures which might damage components of the DC-DC converter.

To enhance the ignition behavior of a lamp operated with a circuit arrangement according to the invention, it is possible to implement the circuit arrangement in such a way that the first circuit comprises a lamp electrode during operation. When the second switching element is conducting, the current flowing through the first circuit also flows through this lamp electrode so that it is preheated. Since the lamp is fed with a DC current after ignition, a considerable improvement of the ignition behavior can be realized if only the lamp electrode constituting the cathode of the lamp during stationary lamp operation is preheated.

If the circuit arrangement comprises a capacitive element which shunts the lamp during operation, it is ensured that, on the one hand, the amplitude of the generated ignition voltage across the lamp is relatively low, but, on the other hand, the period of time during which the ignition voltage is present across the lamp increases. It has been found that the ignition behavior of the lamp can thereby be influenced positively.

It has been found that the circuit arrangement according to the invention is particularly suitable for use in the ballast circuit of a compact lamp comprising
- a light-transmissive discharge vessel having a filling comprising a rare gas, and two electrodes,
- a lamp housing secured to the discharge vessel,
- a lamp cap having electric contacts and secured to the lamp housing, and
- a ballast circuit coupled between the contacts and the electrodes for generating a lamp current from a power supply voltage.

More particularly, a circuit arrangement according to the invention may be eminently used in the ballast circuit of a compact fluorescent lamp, or a lamp whose discharge vessel filling comprises mercury and in which a wall of the discharge vessel has a luminescent coating.

These and other aspects of the invention will be apparent from and will be elucidated, by way of non-limitative example, with reference to the embodiment(s) described hereinafter.

DESCRIPTION OF THE PREFERRED EMBODIMENTS

Figure 1:
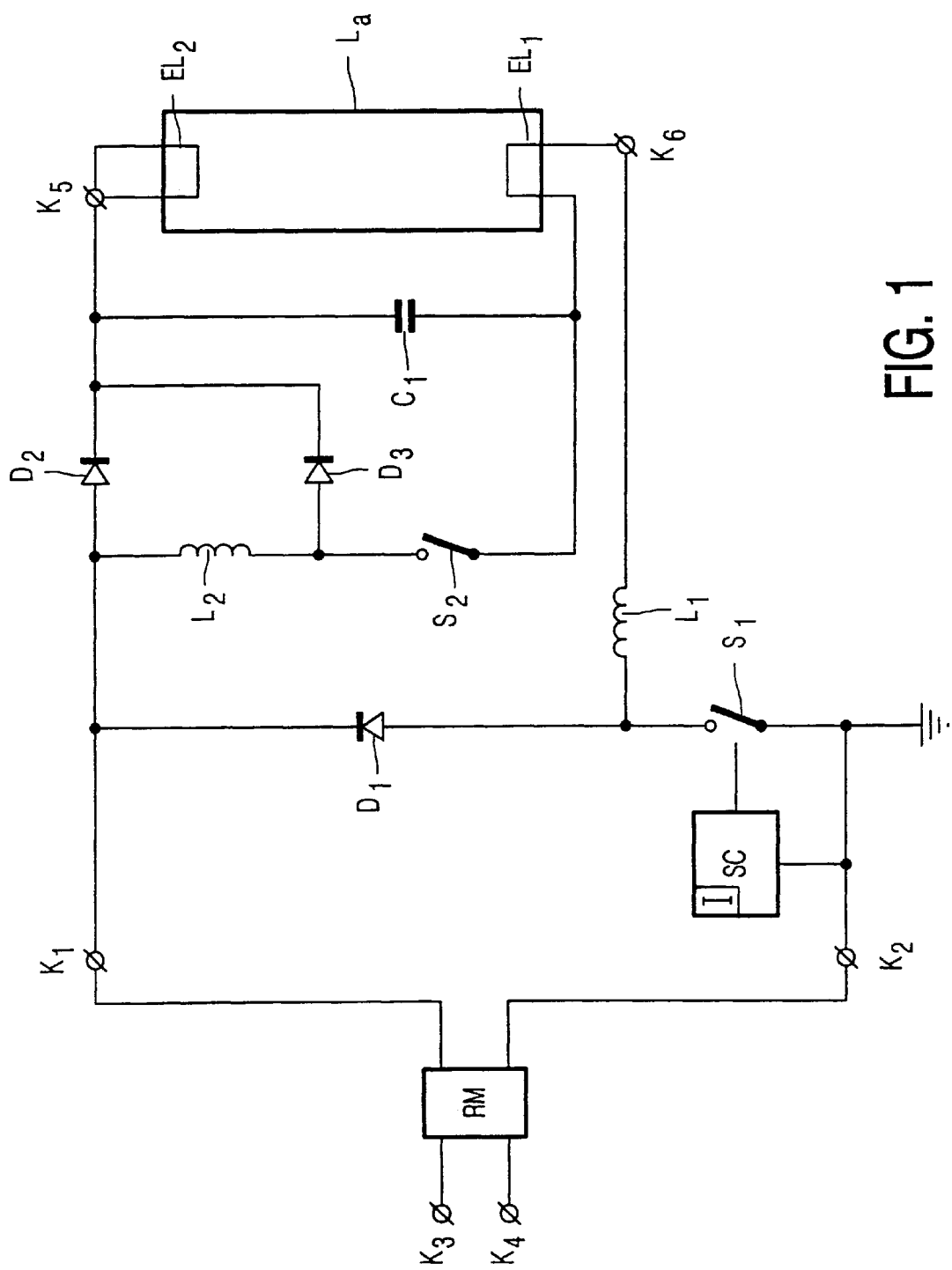
FIG. 1 shows diagrammatically an embodiment of a circuit arrangement according to the invention, with a lamp $L_a$ connected thereto.

In FIG. 1, the reference symbols $K_3$ and $K_4$ denote terminals for connection to an AC voltage source. Terminals $K_3$ and $K_4$ are connected to respective inputs of circuit section RM for generating a DC power supply voltage from an AC voltage supplied by the AC voltage source. $K_1$ and $K_2$ constitute input terminals for connection to the terminals of a power supply source supplying a DC voltage. In this embodiment, this power supply source is constituted by the AC voltage source together with the circuit section RM. Input terminals $K_1$ and $K_2$ are connected to respective output terminals of the circuit section RM. Input terminal $K_1$ is connected to input terminal $K_2$ by means of a series arrangement of diode $D_1$ and switching element $S_1$, constituting, in this embodiment, a first unidirectional element and a first switching element, respectively. A control electrode of switching element $S_1$ is coupled to an output of a circuit section SC which constitutes a control circuit for rendering the first switching element $S_1$ conducting and non-conducting. Diode $D_1$ is shunted by a series arrangement of coil $L_2$, glow discharge starter $S_2$, a first lamp electrode $EL_1$ of lamp $L_a$ and coil $L_1$. In this embodiment, glow discharge starter $S_2$ constitutes a second switching element together with means for rendering the second switching element conducting and non-conducting. Coil $L_1$ constitutes a first inductive element. Coil $L_2$ constitutes a second inductive element. One end of a second lamp electrode $EL_2$ is connected to an output terminal $K_5$ for connection of the lamp. A second output terminal $K_6$ for connection of the lamp is shown diagrammatically as a common point of the first lamp electrode $EL_1$ and coil $L_1$. A discharge lamp $L_a$ is connected to the output terminals $K_5$ and $K_6$. Discharge lamp $L_a$ is shunted by a capacitor $C_1$ which constitutes a capacitive element in this embodiment. Switching element $S_1$, circuit section SC, diode $D_1$, coil $L_1$ and output terminals $K_5$ and $K_6$ jointly constitute a DC-DC converter of the down-converter type. Output terminals $K_5$ and $K_6$ are connected by means of a first circuit constituted by a series arrangement of diode $D_2$, coil $L_2$, glow discharge starter $S_2$ and lamp electrode $EL_1$. Coil $L_2$ and diode $D_2$ are shunted by diode $D_3$. In this embodiment, diodes $D_2$ and $D_3$ constitute a second and a third unidirectional element, respectively. Diode $D_3$ also constitutes a second circuit.

The embodiment shown in FIG. 1 operates as follows.

If terminals $K_3$ and $K_4$ are connected to terminals of an AC voltage source, the circuit section RM generates a DC power supply voltage from an AC voltage supplied by the AC voltage source, which DC power supply voltage is present between the input terminals $K_1$ and $K_2$. Immediately after the circuit arrangement is put into operation, the glow discharge starter becomes conducting, while switching element $S_1$ is rendered conducting and non-conducting at frequency f by the circuit section SC. During the period when the glow discharge starter and switching element $S_1$ are conducting, a current flows from input terminal $K_1$ to input terminal $K_2$, via the coil $L_2$, glow discharge starter $S_2$, the first lamp electrode $EL_1$, coil $L_1$ and switching element $S_1$. During the period when the glow discharge starter $S_2$ is conducting and the switching element $S_1$ is non-conducting, a current flows from a first end of coil $L_1$ via diode $D_1$, coil $L_2$, the glow discharge starter and first lamp electrode $EL_1$ to a second end of coil $L_1$. The frequency f and the duty cycle with which the circuit section SC renders the switching element $S_1$ conducting are chosen to be such that the current in coil $L_1$ and coil $L_2$ is a continuous current having a relatively high minimal amplitude. When glow discharge starter $S_2$ becomes non-conducting, a current flows from the first end of coil $L_1$ via diode $D_1$, coil $L_2$, diode $D_3$, capacitor $C_1$ and electrode $EL_1$ to the second end of coil $L_1$. A current also flows from a first end of coil $L_2$ via diode $D_3$, capacitor $C_1$, electrode $EL_1$, coil $L_1$ and diode $D_1$ to a second end of coil $L_2$. These two currents charge the capacitor $C_1$ to an ignition voltage which is present across the lamp $L_a$. If the lamp $L_a$ does not ignite at this ignition voltage, glow discharge starter $S_2$ again becomes consecutively conducting and non-conducting. When glow discharge starter $S_2$ becomes non-conducting again, capacitor $C_1$ is charged again. Since the capacitor has not been able to discharge due to the presence of diodes $D_2$ and $D_3$, the voltage across the capacitor increases whenever the glow discharge starter $S_2$ becomes non-conducting, until the lamp ignites. If the lamp $L_a$ ignites at the ignition voltage, the circuit section I of control circuit SC decreases the frequency f with which the circuit section SC renders the switching element $S_1$ conducting and non-conducting so that the DC-DC converter is operated in the discontinuous mode and the current in coil $L_1$ becomes zero in each high-frequency period. Circuits for reducing the frequency are known, one example thereof is described in U.S. Pat. No. 4,952,849 by Fellows et al (see, for example, col. 7, lines 23–25). The lamp is subsequently fed with this DC current. The operating voltage of the lamp $L_a$ has such a value that no glow discharge is effected by this voltage in the glow discharge starter so that the glow discharge starter $S_2$ remains non-conducting after ignition of the lamp $L_a$ and coil $L_2$ does not convey a current, while no ignition voltage is generated any longer.

It is possible to measure the lamp current with means which are not shown in FIG. 1, to compare it with a reference value, and to adjust the frequency and/or the duty cycle of the switching element $S_1$ via the circuit section SC (i.e. circuit Section I thereof) in dependence upon the result of this comparison. In this way, the amplitude of the DC current with which the lamp is fed is controlled at a substantially constant value.

Figure 2:
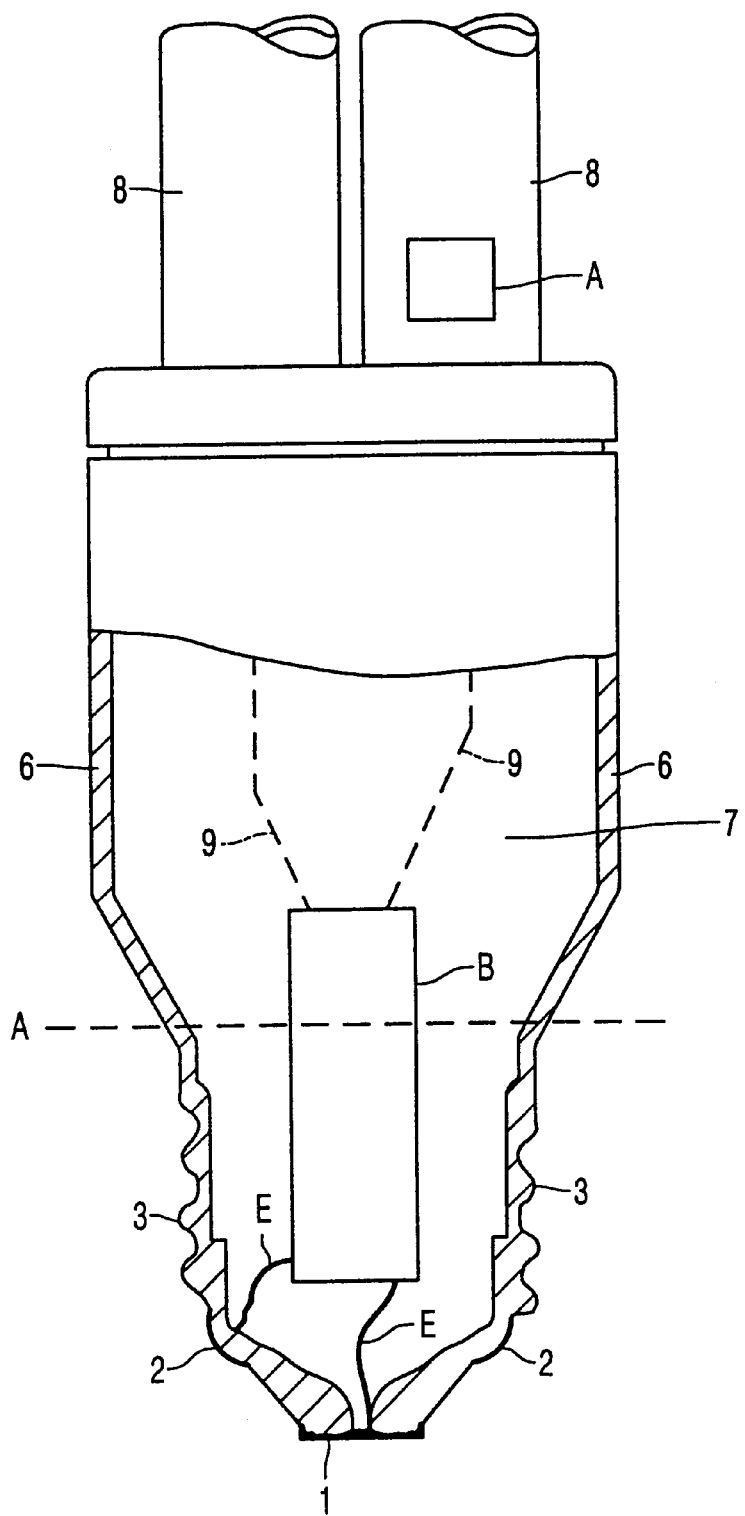
FIG. 2 shows a compact fluorescent lamp according to the invention.

In FIG. 2, the reference numeral 8 denotes a light-transmissive discharge vessel having a mercury and rare-gas filling and two electrodes (not shown). A luminescent coating is provided on the wall of the discharge vessel. The reference numeral 6 denotes a lamp housing which is secured to the discharge vessel 8, and the reference numeral 3 denotes a lamp cap provided with electric contacts (1 and 2) and secured to the lamp housing, while B is a diagrammatic representation of a ballast circuit B constituted by a circuit arrangement according to the invention, coupled between the contacts (1, 2) via the conductors E and the electrodes (via conductors 9) for generating a DC lamp current from a power supply voltage.

What is claimed is:

1. A circuit arrangement for igniting and supplying a lamp with a DC current, comprising:

input terminals for connection to terminals of a power supply source supplying a DC voltage, a DC-DC converter coupled to the input terminals and provided with a first inductive element, a first unidirectional element, a first switching element, a control circuit coupled to a control electrode of the first switching element for rendering the first switching element conducting and non-conducting at a frequency f, output terminals for connecting the lamp, and a first circuit which connects the output terminals during operation and comprises a second switching element which is rendered conducting and non-conducting, characterized in that the first circuit comprises a series arrangement of the second switching element, a second inductive element and a second unidirectional element, and the series arrangement of the second inductive element and the second unidirectional element is shunted by a second circuit comprising a third unidirectional element.

2. A circuit arrangement as claimed in claim 1, wherein the second switching elementcomprises a glow discharge starter.

3. A circuit arrangement as claimed in claim 1, wherein the first circuit comprises a lamp electrode.

4. A circuit arrangement as claimed in claim 1, wherein the first switching element is rendered conducting and non-conducting by the control circuit in such a way that the first inductive element and the second inductive element convey a continuous current before ignition of the lamp.

5. A circuit arrangement as claimed in claim 1, wherein the first switching element is rendered conducting and non-conducting by the control circuit in such a way that the first inductive element conveys a discontinuous current after ignition of the lamp.

6. A circuit arrangement as claimed in claim 1, wherein the control circuit includes a circuit section I for decreasing the frequency f after ignition of the lamp.

7. A circuit arrangement as claimed in claim 1, wherein the control circuit includes means for reducing the duty cycle of the first switching element after ignition of the lamp.

8. A circuit arrangement as claimed in claim 1, wherein the circuit arrangement also comprises a capacitive element shunting the lamp during operation.

9. A compact lamp comprising:
   a light-transmissive discharge vessel having a filling comprising a rare-gas, and two electrodes,
   a lamp housing secured to the discharge vessel,
   a lamp cap having electric contacts and secured to the lamp housing, and
   a ballast circuit coupled between the contacts and the electrodes for generating a lamp current from a power supply voltage,
   characterized in that the ballast circuit comprises a circuit arrangement as claimed in claim 1.

10. A compact lamp as claimed in claim 9, wherein the compact lamp is a compact fluorescent lamp.

11. A circuit arrangement as claimed in claim 1 wherein, during stable operation of a connected lamp, the second switching element is held in a non-conductive state whereby the second inductive element conveys no current during the stable lamp operation.

12. A circuit arrangement as claimed in claim 2 wherein, during stable operation of a connected lamp, the lamp operating voltage is below the glow discharge starter ignition voltage, whereby the glow discharge starter is held in a non-conductive state so that the second inductive element conveys no current during the stable lamp operation.

13. A circuit arrangement as claimed in claim 8 wherein, during the ignition phase of the lamp, the first and second switching elements, the first and second unidirectional elements, and the first and second inductive elements cooperate so as to raise the voltage on the capacitive element to the ignition voltage of the lamp.

14. A circuit arrangement as claimed in claim 8 wherein the first and second unidirectional elements comprise first and second diodes, respectively, the second switching element is alternately conductive and non-conductive during the lamp ignition phase, and said first and second diodes are polarized so that, during the lamp ignition phase, said diodes prevent discharge of the capacitive element via the conductive second switching element.

15. A circuit for igniting and operating a discharge lamp comprising:
   first and second input terminals for connection to terminals of a source of DC supply voltage,
   first and second output terminals for connection to a discharge lamp,
   a first diode and a first switching element connected in a first series circuit across the first and second input terminals,
   a control circuit coupled to a control electrode of the first switching element to make it alternately conduct and non-conduct at a frequency (f),
   a second diode, a second inductive element and a second switching element connected in a second series circuit to the first and second output terminals, wherein
      the second switching element is alternately conductive and non-conductive during the lamp ignition phase, and
      a third diode is coupled in shunt with the series arrangement of the second diode and the second inductive element.

16. The circuit as claimed in claim 15 further comprising:
   a capacitive element coupled to the first and second output terminals so as to shunt a connected discharge lamp, wherein
   during the lamp ignition phase, the first and second switching elements are each alternately conductive and non-conductive, and cooperate with the first and second diodes and the first and second inductive elements so that a lamp ignition voltage is developed across the capacitive element that is the joint contribution of energy supplied by the first and second inductive elements.

17. The circuit as claimed in claim 16 wherein,
   during the stable operation phase of a connected discharge lamp, the second switching element is held in a non-conductive state so that the second inductive element conveys no current during the stable lamp operation phase.

18. The circuit as claimed in claim 15 wherein the second series circuit further comprises at least one electrode of a connected discharge lamp such that a preheat current flows therein during the ignition phase of the discharge lamp.

19. The circuit as claimed in claim 15 wherein, during stable operation of a connected discharge lamp, the lamp operating voltage is at a lower voltage level than the lamp ignition voltage, whereby said second switching element is held in a non-conductive state during stable lamp operation such that the second inductive element conveys no current during the stable lamp operation.

20. The circuit as claimed in claim 15 wherein, during the ignition phase of the discharge lamp, the control circuit makes the first switching element alternately conductive and non-conductive such that the first and second inductive elements convey a continuous current, and
   during stable operation of the discharge lamp the first inductive element conveys a discontinuous current, and the second switching element is held in a non-conductive state so that the second inductive element conveys no current during the stable lamp operation.

* * * * *